(12) United States Patent
Liu et al.

(10) Patent No.: US 9,645,470 B2
(45) Date of Patent: May 9, 2017

(54) HIGH HARMONIC OPTICAL GENERATOR

(71) Applicants: Lewis Liu, Oxford (GB); Kevin O'Keefe, Oxford (GB); Simon Hooker, Oxford (GB)

(72) Inventors: Lewis Liu, Oxford (GB); Kevin O'Keefe, Oxford (GB); Simon Hooker, Oxford (GB)

( * ) Notice: Subject to any disclaimer, the term of this patent is extended or adjusted under 35 U.S.C. 154(b) by 0 days.

(21) Appl. No.: 14/401,671

(22) PCT Filed: May 10, 2013

(86) PCT No.: PCT/GB2013/051221
§ 371 (c)(1),
(2) Date: Nov. 18, 2014

(87) PCT Pub. No.: WO2013/171464
PCT Pub. Date: Nov. 21, 2013

(65) Prior Publication Data
US 2015/0086148 A1     Mar. 26, 2015

(30) Foreign Application Priority Data

May 18, 2012   (GB) .................................. 1208753.2

(51) Int. Cl.
*G02F 1/383* (2006.01)
*G02B 6/036* (2006.01)
(Continued)

(52) U.S. Cl.
CPC ......... *G02F 1/383* (2013.01); *G02B 6/02328* (2013.01); *G02B 6/03605* (2013.01);
(Continued)

(58) Field of Classification Search
None
See application file for complete search history.

(56) References Cited

U.S. PATENT DOCUMENTS

| 6,151,155 A | 11/2000 | Durfee, III et al. |
| 2006/0120412 A1 | 6/2006 | Liu |

(Continued)

FOREIGN PATENT DOCUMENTS

| EP | 0227366 A2 | 7/1987 |
| EP | 2148241 A1 | 1/2010 |

OTHER PUBLICATIONS

X. Chen et al. Generation of 4.3 fs, 1 mJ laser pulses via compression of circularly polarized pulses in a gas-filled hollow-core fiber. Optics Letters, 34:10:1588-1590, May 15, 2009.*

(Continued)

*Primary Examiner* — Mike Stahl
(74) *Attorney, Agent, or Firm* — Schwegman Lundberg & Woessner, P.A.

(57) ABSTRACT

A high harmonic optical generator comprising a laser arrangement for emitting a beam of polarized radiation at a fundamental frequency and an optical waveguide having a hollow core for a gaseous harmonic generation medium for the generation of high harmonics of the fundamental frequency, the optical waveguide having an optical propagation axis along the hollow core, the laser arrangement is configured to couple the beam of polarized radiation along the propagation axis of the hollow core optical waveguide to provide a beam of optical driving radiation for the high harmonic generation, the optical driving radiation having a plane of polarization that rotates about the propagation axis.

26 Claims, 6 Drawing Sheets

(51) Int. Cl.
| | |
|---|---|
| *G02B 6/02* | (2006.01) |
| *G02F 1/35* | (2006.01) |
| *G02F 1/355* | (2006.01) |
| *G02F 1/365* | (2006.01) |
| *G02B 6/10* | (2006.01) |
| *G02F 1/095* | (2006.01) |

(52) U.S. Cl.
CPC ............. *G02B 6/105* (2013.01); *G02F 1/095* (2013.01); *G02F 1/3544* (2013.01); *G02F 1/3558* (2013.01); *G02F 1/365* (2013.01); *G02F 2001/3548* (2013.01)

(56) References Cited

U.S. PATENT DOCUMENTS

| | | | |
|---|---|---|---|
| 2007/0274623 A1* | 11/2007 | Terrel et al. ........... | G02F 1/0136 385/11 |
| 2008/0080044 A1 | 4/2008 | Okayama et al. | |
| 2008/0101424 A1 | 5/2008 | Wang | |
| 2008/0137696 A1* | 6/2008 | Zhang et al. ............. | H01S 4/00 372/22 |
| 2009/0168814 A1 | 7/2009 | Achtenhagen | |
| 2010/0110534 A1* | 5/2010 | Muramatsu et al. . | G02F 1/3775 359/328 |

OTHER PUBLICATIONS

"English Application Serial No. GB1208753.2, Search Report mailed Sep. 19, 2012", 3 pgs.

"Intensity discrimination with twisted birefringent optical fibers", Optics Letters 11(10), (Oct. 1986), 668-670.

"International Application Serial No. PCT/GB2013/051221, Search Report and Written Opinion mailed Jul. 1, 2013", 11 pgs.

Backus, Sterling, et al., "Generation of spatially coherent light at 13nm using quasi phase-matching in modulated hollow fibers", IEEE Quantum Electronics and Laser Science, (2003), 2 pgs.

Heckl, O. H., et al., "High harmonic generation in a gas-filled hollow-core photonic crystal fiber", Appl Phys B 97, (2009), 369-373.

Husakou, A., et al., "Polarization gating and circularly-polarized high harmonic generation using plasmonic enhancement in metal nanostructures", Optics Express 19(25), (Dec. 2011), 9 pgs.

Jerphagnon, J., et al., "Optical Activity of Crystals", J. Chem. Phys. 65, (1976), 1522-1529.

Lou, J W, et al., "Polarization Insensitive Demultiplexing of 100-Gb/s Words Using a Twisted Fiber Nonlinear Optical Loop Mirror", IEEE Photonics Technology Letters 11(12), (Dec. 1999), 1602-1604.

Serebryannikov, E. E., et al., "Phase-matching solutions for high-order harmonic generation in hollow-core photonic-crystal fibers", Physical Review E 70, (2004), 066619 1-7.

Serebryannikov, Evgenii E, et al., "Broadband dynamic phase matching of high-order harmonic generation by a high-peak-power soliton pump field in a gas-filled hollow photonic-crystal fiber", Optics Letters 33(9), (May 2008), 977-979.

Travers, John C, et al., "Ultrafast nonlinear optics in gas-filled hollow-core photonic crystal fibers [Invited]", J. Opt. Soc. Am. B 28(12), (Dec. 2011), A11-A26.

Tsia, K. K, et al., "Electrical tuning of birefringence in silicon waveguides", Applied Physics Letters 92, (2008), 061109 1-3.

Wolinski, Tomasz R, et al., "Stress effects in twisted highly birefringent fibers", SPIE vol. 2070 Fiber Optic and Laser Sensors IX, (1993), 392-403.

"European Application Serial No. 13722033.1, Communication pursuant to Article 94(3) EPC mailed Mar. 16, 2016", 6 pgs.

\* cited by examiner

Figure 1C(iii)

HIGH HARMONIC OPTICAL GENERATOR

PRIORITY APPLICATIONS

This application is a U.S. National Stage Filing under 35 U.S.C. §371 from International Application No. PCT/GB2013/051221, filed on 10 May 2013, and published as WO/2013/171464 on 21 Nov. 2013, which claims the benefit under 35 U.S.C. §119 to United Kingdom Application No. 1208753.2, filed on 18 May 2012; which applications and publication are incorporated herein by reference in their entirety.

The present invention relates to high harmonic optical generation of polarized radiation by quasi phase-matching within a hollow cored optical waveguide.

BACKGROUND

High harmonic generation (HHG) is a technique for the production of coherent extreme ultraviolet (XUV, 120-10 nm) and soft x-ray (SXR, 10-0.1 nm) radiation. For this application, high harmonic generation is considered to relate to the generation of harmonics having free space wavelengths of up to 120 nm. The simple theoretical process for HHG was described by Corkum in three steps: (i) ionization of a ground state atom by high intensity, coherent driving radiation via quantum tunnelling of the electron to the continuum; (ii) propagation of the electron in the continuum under the electromagnetic force of the driving radiation; and (iii) recombination with the ion to release a harmonic photon.

It is known to focus linearly polarized incident light from a pulsed laser into a noble gas (e.g. argon) with a peak intensity of order $10^{14}$ W cm$^{-2}$ or greater, generating coherent beams of high harmonic radiation with frequencies that are odd integer harmonics of the frequency of the incident light from the laser.

A significant drawback with HHG is that it is inefficient, due to phase-mismatch, which is caused by the different phase velocities of the fundamental driving radiation and the high harmonic radiation generated. The consequence of the different phase velocities is that harmonically generated photons produced at a particular location within the generation medium will not, in general, be in phase with the harmonically generated photons that were produced from the fundamental radiation field at a different location. This leads to alternating regions of constructive and destructive interference of the high harmonic radiation within the generating medium (e.g. along an optical waveguide), with the intensity of a high harmonic radiation oscillating back to zero with a period of twice the coherence length ($L_c$), where the coherence length is defined as the distance over which a $\pi$ phase difference accumulates between the harmonic radiation and the local phase of harmonic generation from the fundamental radiation.

Without implementing additional techniques, the conversion efficiency for generating photons with energies up to about 100 eV is of the order $10^{-7}$, and this decreases to as little as $10^{-15}$ for harmonic photon energies near 1 keV. Although phase-matching techniques are known, and can significantly improve generation efficiency, such techniques are restricted to relatively low-order harmonics.

Quasi phase-matching (QPM) seeks to enhance harmonic generation efficiency by periodically suppressing harmonic generation with a period of twice the coherence length to eliminate regions of destructive interference and leave only regions in which the generated harmonics interference constructively with the harmonic radiation generated elsewhere in the generation medium.

A first approach to producing linearly polarized high harmonic radiation by QPM has been to provide longitudinal, periodic modulation of the non-linear properties along the optical propagation axis. In one example, it is known to provide alternating regions of argon and nitrogen with a period of twice the coherence length, with constructive interference occurring within the argon regions, and with destructive interference being suppressed in the nitrogen regions. In a further example, it is known to periodically modulate the diameter of the hollow core of a gas-filled hollow-core optical waveguide, with the modulation period matched to the coherence length, so that the intensity of the fundamental wave radiation propagating through the hollow core is modulated periodically along the propagation axis of the optical waveguide, and hence to modulate the rate of generation of the high harmonic periodically. However, this approach is limited to relatively low-order harmonics since high-order harmonics have short coherence lengths, whereas modulation of the fundamental wave (i.e. the driving beam) occurs over a distance of order the Rayleigh range (e.g. up to a few millimeters); hence, as the period of the modulation is reduced, the modulation of the intensity of the fundamental wave is also reduced.

A second approach to producing linearly polarized high harmonic radiation by QPM has been "intensity beating" of two different modes of a conventional hollow core waveguide. In this approach, a single linearly polarized input beam induces two different waveguide modes of the waveguide, which are both linearly polarized with parallel polarizations. The excited modes beat, as they propagate along the propagation axis of the waveguide, causing the axial intensity of the propagating radiation to be modulated with a period determined by the different wave-vectors of the modes. The key requirement for controlled beating of waveguide modes is controlled mode excitation at the entrance of the waveguide, but does not require any special type of waveguide. However, quasi-phase-matching to produce high-order harmonics can be difficult with this technique, since it requires controlled excitation of different waveguide modes, by spatial light modulation techniques.

A third approach to producing linearly polarized high harmonic radiation by QPM has been to interfere radiation of a fundamental wave driving pulse with a weak counter-propagating pulse train of the same frequency, leading to harmonic generation only at points in the harmonic generation medium where the driving pulse does not overlap with one of the pulses in the counter-propagating pulse train. This method suffers from the disadvantage that additional optical systems, and increased driving laser energy, are required to generate the pulse train.

An approach to generate circularly polarized high harmonics is known, in which a polarization gating technique is used with circularly polarized pump radiation incident onto an arrangement of bowtie-type nanoantennae on a silicon substrate, in which alternating nanoantennae are perpendicular. However, disadvantageously, the generation efficiency of this technique is low, and requires precise micro-machining of the nanoantennae. Further, the power of the incident driving radiation may be limited due to a low damage threshold of such structures.

SUMMARY OF THE DISCLOSURE

According to an aspect of the present invention, there is provided a high harmonic optical generator comprising
- a laser arrangement for emitting a beam of polarized radiation at a fundamental frequency and
- an optical waveguide having a hollow core for a gaseous harmonic generation medium for the generation of high harmonics of the fundamental frequency, the optical waveguide having an optical propagation axis along the hollow core,
- the laser arrangement is configured to couple the beam of polarized radiation along the propagation axis of the hollow core optical waveguide to provide a beam of optical driving radiation for the high harmonic generation, the optical driving radiation having a plane of polarization that rotates about the propagation axis.

Advantageously, through rotation of the plane of polarization of the driving radiation mode about the propagation axis, circularly polarized high harmonic radiation may be generated.

The optical waveguide may be a circularly birefringent optical waveguide, and the laser arrangement may be configured for coupling a single linearly polarized beam into the optical waveguide.

The circularly birefringent optical waveguide may be a passively circularly birefringent optical waveguide. The circularly birefringent optical waveguide may comprise material selected from the group consisting of quartz, $TeO_2$, $AgGaS_2$, HgS and $Hg_3Te_2Cl_2$.

Advantageously, the use of a passively circularly birefringent optical waveguide enables low complexity of the generator and low cost manufacture.

The optical waveguide may comprise a circularly birefringent photonic crystal fibre.

Advantageously, the degree of circular birefringence may be selected by the design of the photonic crystal fibre.

The optical generator may comprise an axial twist control mechanism for tuning the rotational power of the circularly birefringent optical waveguide by axially twisting the optical waveguide.

The optical waveguide may be configured to produce optical rotation under a magnetic field, and the optical waveguide may further comprise an electromagnetic coil configured to produce a magnetic field along the propagation axis of the optical waveguide. The optical waveguide may comprise a material selected from the group consisting of yttrium iron garnet, terbium doped glass, poly(3-alkoxythiophene), $AgGaS_2$, and $Hg_3Te_2Cl_2$.

Advantageously, by inducing circular birefringence in the optical waveguide electromagnetically, the rotational period may be controlled to correspond with the coherence length.

The optical generator may be configured for the optical driving radiation to rotate about the propagation axis with a rotational period, and wherein the optical waveguide has a length of at least ten times the rotational period of the optical driving radiation.

The optical generator may comprise an optical waveguide that is passively circularly birefringent and further be configured to produce optical rotation under a magnetic field, and the optical waveguide may further comprise an electromagnetic coil configured to produce a magnetic field along the propagation axis of the optical waveguide.

The optical generator may comprise an optical waveguide that is passively circularly birefringent and further comprises an axial twist control mechanism for tuning the rotational power of the circularly birefringent optical waveguide by axially twisting the optical waveguide.

The optical waveguide may comprise an alternating arrangement of one or more each of left-handed and right-handed circularly birefringent optical waveguide sections. The optical waveguide sections may be passively circularly birefringent. The waveguide sections may be provided with respective electromagnetic coils and a control system configured for inducing alternating axial magnetic fields along the optical waveguide.

The optical generator may be configured for the optical driving radiation to rotate about the propagation axis with a rotational period, and wherein each optical waveguide section has a length of at least ten times the rotational period of the optical driving radiation.

The sums of the lengths of the left-handed waveguide sections and the right-handed waveguide sections may be substantially equal.

Advantageously, by alternating the direction of rotation of the driving radiation mode, linearly polarized high harmonic radiation may be generated.

The optical waveguide may be non-birefringent.

The laser arrangement may comprise a laser and an optical conditioning unit, wherein the optical conditioning unit is configured to receive a polarized beam from the laser and emit a plurality of substantially collinear contra-rotating circularly polarized beams that are coupled along the propagation axis of the hollow core optical waveguide, and the optical conditioning unit may be configured to couple the plurality of circularly polarized beams into different modes of the optical waveguide.

The optical waveguide may have a period of rotation at the fundamental frequency, and an axial length along the propagation axis is substantially an integer multiple of half of the period of rotation ($2L_r$).

Advantageously, after propagating along the propagation axis for an integer multiple of the period of rotation, the generated high harmonic generation may be substantially circularly polarized.

The optical waveguide may have a period of rotation at the fundamental frequency, and an axial length along the propagation axis of at least five times the length of the period of rotation.

Advantageously, after several times the period of rotation, the generated high harmonic generation may be substantially circularly polarized, even when the length of propagation axis is not an integer multiple of the rotation period.

The optical waveguide may have an inner cladding layer around the hollow core and an outer cladding layer around the inner cladding layer, and wherein the inner cladding layer has a higher refractive index for radiation from the laser arrangement than the outer cladding layer.

The optical waveguide may have a substantially uniform cross-section along the propagation axis.

The laser arrangement may comprise a laser configured and an optical polarizing filter may be provided to filter light emitted from the laser.

A gaseous harmonic generation medium is provided within the hollow core.

BRIEF DESCRIPTION OF THE DRAWINGS

Embodiments of the invention are further described hereinafter with reference to the accompanying drawings, in which:

FIGS. 1C(i), (ii) and (iii) show the optical rotation of the electric field of driving radiation travelling along the optical waveguide of FIG. 1A, and the corresponding rate of generation of high harmonic radiation;

DETAILED DESCRIPTION

Like reference numerals refer to like elements throughout.

Figure 1A:
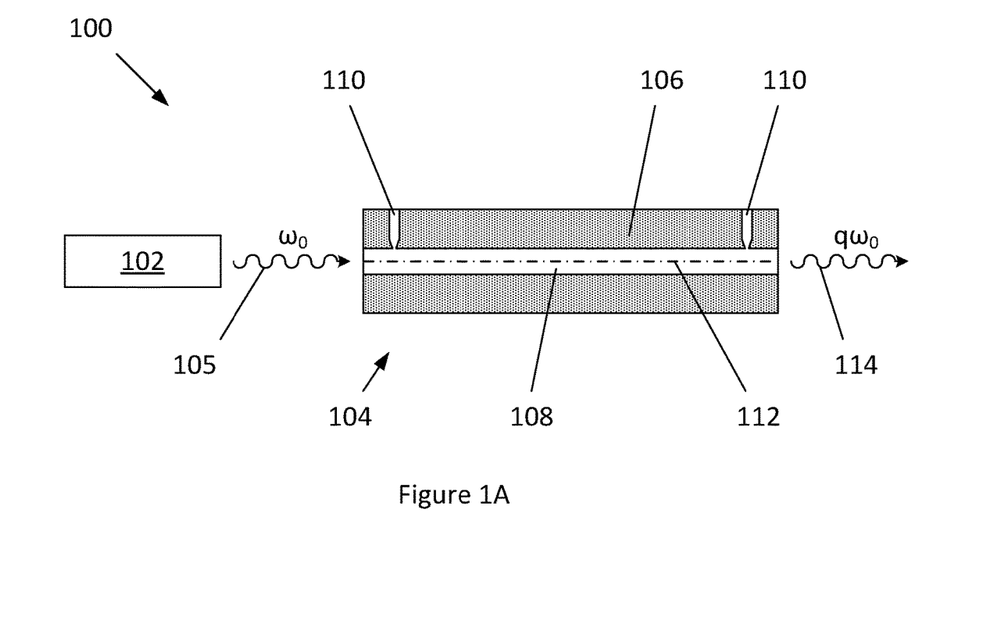
FIG. 1A shows an optical generator for high harmonic generation comprising a laser and an circularly birefringent optical waveguide.

FIG. 1A shows an optical generator 100 for high harmonic generation comprising a laser 102 and a circularly birefringent hollow core optical waveguide 104. The laser 102 (e.g. which may have a wavelength in the visible or infrared spectrum, such as a pulsed Ti:Sapphire laser having a free space wavelength of 800 nm) is configured to emit linearly polarized radiation 105 of fundamental frequency $\omega_0$, which is incident into the optical waveguide 104.

Figure 1B:
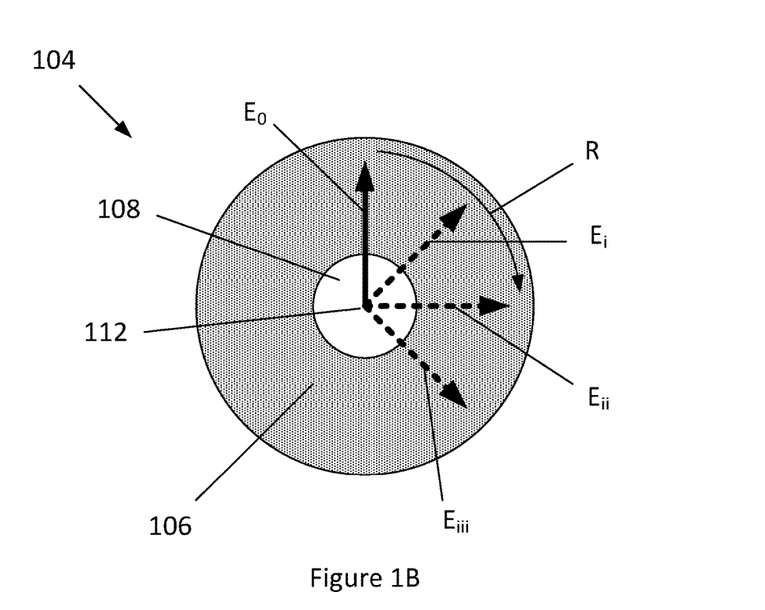
FIG. 1B shows an end view of the optical waveguide of FIG. 1A.
Figure 1C:
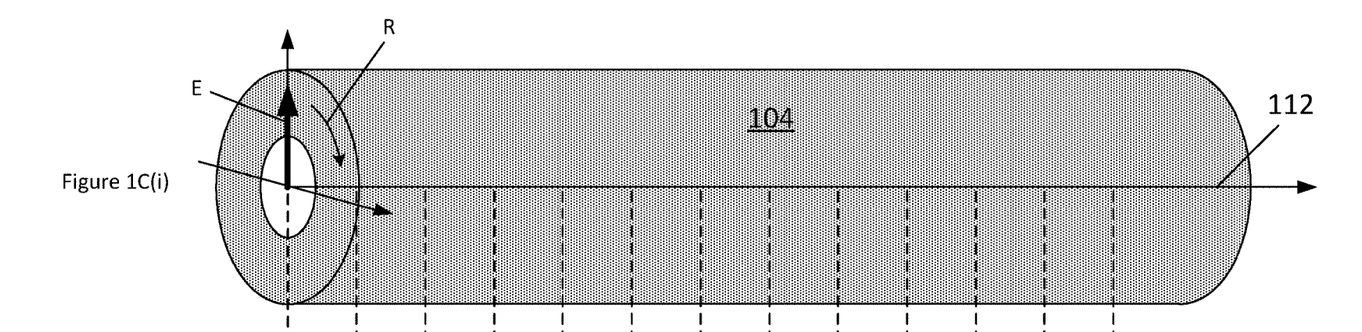

FIG. 1B shows an end view of the optical waveguide 104, which comprises a cladding layer 106, around a hollow core 108. Gas injection ports 110 are provided for the injection of a gaseous harmonic generation medium (e.g. a noble gas, such as argon) into the hollow core 108, and a vacuum (or low pressure environment) is provided around the optical waveguide 104. However, it will be appreciated that the gas may be provided within the hollow core 108 by other methods. The hollow core 108 has a substantially uniform cross-section along the optical axis 112 of the optical waveguide 104.

The optical waveguide 104 illustrated is a capillary that is 40 mm long (it may be between 10 and 100 mm in length, and preferably 30 to 60 mm), has a 3 mm external diameter, the cladding layer 106 has an optically active refractive index (e.g. quartz, $TeO_2$, $AgGaS_2$, HgS or $Hg_3Te_2Cl_2$), and the hollow core is circular in cross-section with an average diameter of 5 to 100 μm.

The cladding layer 106 of the hollow core optical waveguide 104 comprises passively circularly birefringent material, i.e. optically active without the requirement for the application of further control, such as a magnetic field or axial twisting of the optical waveguide 104. The circular birefringence may be right- or left-handed. The optical waveguide 104 has an optical rotational power in the range of $10^2$ to $10^{4}$°/mm (degree/mm). For example the circularly birefringent material may be yttrium iron garnet (YIB).

The coherence length $L_c$ is defined as the distance over which a π (pi) phase difference locally accumulates between the harmonic radiated and the fundamental driving radiation ($L_c=\pi/\Delta k$, where $\Delta k$ is the wave vector mismatch between the fundamental and higher order modes). For example, in the case of the incident radiation having a free space wavelength of 800 nm, this provides a coherence length of the fundamental waveguide mode and the preferred high order harmonic of the order of 0.1 to 1 mm.

The incident radiation 105 is optically coupled into the optical waveguide with an intensity profile that is matched to a single mode of the optical waveguide (e.g. the incident focal spot size is matched to the fundamental, lowest order mode). FIGS. 1B and 1C(i) show the alignment of the electric field E (i.e. the plane of polarization) of the incident radiation 105 when it enters the optical waveguide 104.

The linearly polarized radiation 105 from the laser 102 is incident into the optical waveguide 104, along the propagation axis 112 within the hollow core 108. The light is centred on the propagation axis 112, and is mainly concentrated within the hollow core 108. However, the propagating mode also penetrates into (i.e. optically overlaps with) the cladding layer 106 of the optical waveguide 104. At the frequency of the propagating driving mode, the optical waveguide 104 is circularly birefringent about the propagation axis 112, due to the material properties of the cladding layer 106. Consequently, the circular birefringence of the optical waveguide 104 affects the propagating driving mode. Consequently, the electric field $E_0$ of the propagating driving mode rotates in a direction R about the propagation axis (e.g. $E_i$, $E_{ii}$, $E_{iii}$, etc., indicated at exemplary uniformly spaced locations), in correspondence with the direction of circular birefringence of the right-handedly circularly birefringent optical waveguide (following the IEEE convention by which the direction of rotation is defined with respect to the source), with a rotational period $2L_1$, as illustrated in FIGS. 1B and 1C(ii).

As the driving radiation (at fundamental frequency $\omega_0$) propagates along the propagation axis 112 of the optical waveguide 104, high harmonic radiation 114 (at high harmonic frequency $q\omega_0$) is generated. Subject to the attenuation and rate of conversion of the propagating driving mode being low, the intensity with which the high harmonic is generated $\Delta I_{HHG}(z)$ is substantially uniform along the propagation axis z, as illustrated in FIG. 1C(iii). However, the high harmonic is generated with a continuously evolving plane of polarization. By matching the rotational period $2L_r$ of the propagating driving mode to twice the coherence length $2L_c$ (i.e. $L_r=L_c$ for the chosen high harmonic), the high harmonic radiation that is generated is circularly polarized and grows substantially monotonically along the optical waveguide (circular birefringence is frequency dependent and the high harmonic radiation would typically not experience significant circular birefringence). Advantageously, through rotation of the driving radiation mode about the propagation axis, circularly polarized high harmonic radiation may be generated with a superior intensity to previous techniques.

The high harmonic optical generator 100 is optimised for the generation of a particular high harmonic frequency $q\omega_0$ of the propagating driving mode at the fundamental frequency $\omega_0$. However, other high harmonics may also be generated, and the degree of selectivity of the preferred high harmonic increases with the number of rotational periods of the propagating driving mode within the length of the optical waveguide. Accordingly, the length of the optical waveguide is preferably many times the rotational period of the propagating driving mode, e.g. at least ten times, and preferably greater than twenty times.

Alternatively, to the optical waveguide comprising circularly birefringent material, the optical waveguide may comprise a circularly birefringent rotating photonic crystal fibre.

The efficiency of generation of high harmonics is susceptible to the matching of the rotational period and the coherence length.

Figure 1D:
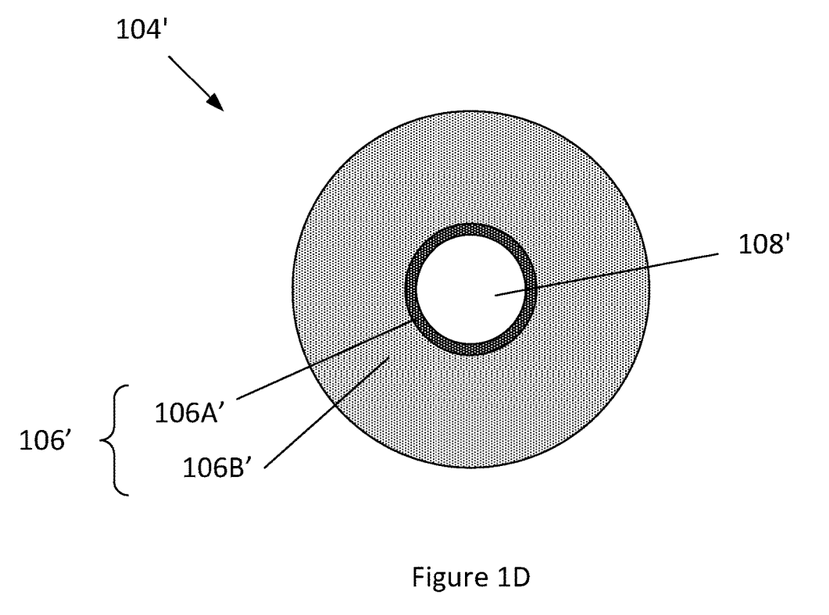
FIG. 1D shows a cross-sectional view of a further optical waveguide.

Alternatively, to control of the overlap of the propagating driving mode and the cladding layer 106', the cladding layer 106' may comprise a higher refractive index inner cladding layer 106A' and a lower refractive index outer cladding layer 106B', as shown in the end view of the optical waveguide 104' in FIG. 1D.

Figure 2:
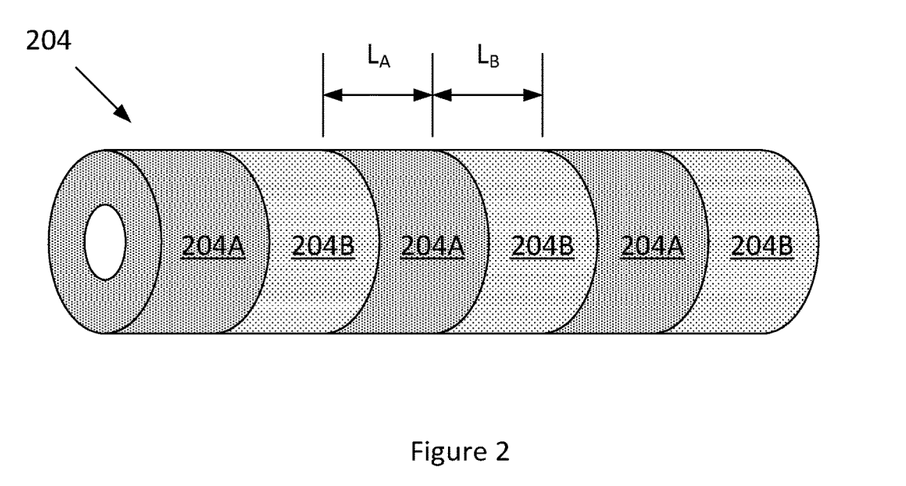
FIG. 2 shows an optical waveguide comprising a plurality of circularly birefringent sections configured for alternating the optical rotation of radiation propagating along the optical waveguide.

FIG. 2 illustrates an alternative optical waveguide 204 for the generation of linearly polarized high harmonic radiation. The optical waveguide 204 comprises alternating left-handedly and right-handedly circularly birefringent waveguide sections 204A and 204B, which have equal lengths $L_A$ and $L_B$. Each waveguide section 204A and 204B is substantially longer than the rotational period $(2L_r)$ of the propagating driving mode, e.g. at least ten times the length of the rotational period. The successive waveguide sections 204A and 204B optically rotate driving radiation that is propagating along the waveguide in opposite directions around the propagation axis (i.e. they are respectively left-handed and right-handed chiral opposites). In particular, the products of the length and rotational power of each of the waveguide sections 204A and 204B are equal in magnitude and opposite in sign. Accordingly, although each section 204A and 204B would individually generate high harmonic radiation that would be circularly polarized, by alternating the waveguide sections 204A and 204B the ellipticity generated by one section is cancelled by the successive section, and the output from the optical waveguide 204 is linearly polarized. There would be at least one waveguide section 204A and 204B of each type, and preferable a plurality of each type (e.g. 2 to 5 of each). To produce linearly polarized high harmonic radiation, the sum of the lengths of the left-handed waveguide sections 204A and the sum of the lengths of the right-handed waveguide sections 204B are substantially equal.

In FIGS. 1A to 2, the optical waveguide is passively circularly birefringent. In contrast, in FIG. 3, the optical waveguide 304 comprises material having a high Verdet coefficient (e.g. yttrium iron garnet, terbium doped glass, poly(3-alkoxythiophene), $AgGaS_2$, $Hg_3TeCl_2$), such that circular birefringence about the propagation axis is induced by the Faraday effect by generating an axial magnetic field in the optical waveguide. The axial magnetic field is generated by an electromagnetic coil 320 that extends around and along the optical waveguide 304, and which is driven with electrical current by a control system 322.

Figure 3:
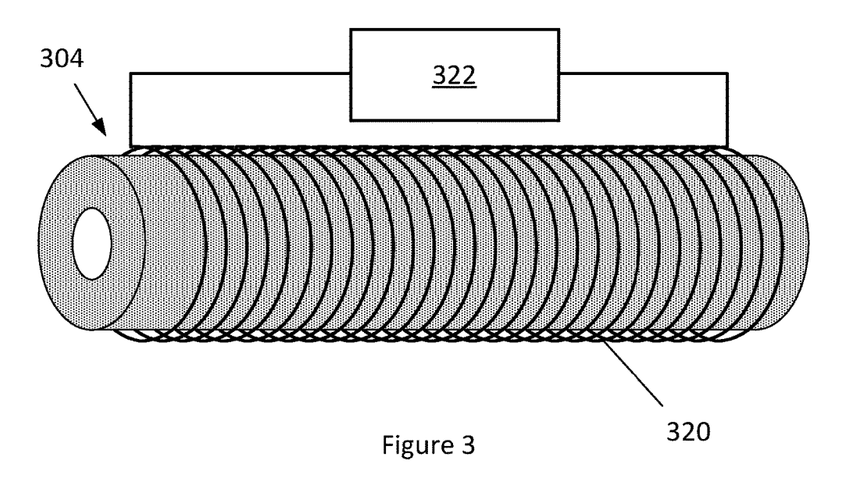
FIG. 3 shows an optical waveguide that produces optical rotation under application of a magnetic field and an electromagnetic coil.

As with FIG. 1, the optical waveguide of FIG. 3 may be used to generate substantially circularly polarized radiation, and the induced magnetic field in use is such that the length of the optical waveguide 304 is at least ten times the rotational period of the propagating driving mode.

Alternatively, a series of electromagnetic coils may be provided axially arranged along the optical waveguide (not shown), which are driven to provide axial magnetic fields in corresponding sections of the optical waveguide, such that the axial magnetic field in successive sections alternates. As with FIG. 2, such an arrangement may be used to generate an output from the optical waveguide that is substantially linearly polarized, and the induced magnetic field in use is such that the length of each of the optical waveguide sections is at least ten times the rotational period of the propagating driving mode.

In a further exemplary embodiment, an electromagnetic coil is provided around a material having a high Verdet constant, and which also is circularly birefringent in the absence of an induced magnetic field. For example, the optical waveguide may comprise $AgGaS_2$, or $Hg_3Te_2Cl_2$. Advantageously, such an arrangement enables fine tuning of the operation of the optical waveguide, for example to match the rotational period of the propagating driving mode to an integer fraction of the length of the optical waveguide. Such an arrangement may provide more accurate and easily controllable fine tuning of the operation of the optical generator than by controlling the pressure of the gas within the hollow core of the optical waveguide. Accordingly, magnetic fine tuning of the operation of the optical generator may supplement or replace gas pressure fine tuning.

Alternatively (or additionally) to electromagnetic tunability of the circular birefringence described in relation to FIG. 3, circular birefringence may be induced and tuned by application of an axial twist to a birefringent optical waveguide by an axial twist control mechanism (not shown), e.g. by the application of a torque about the propagation axis to one end of the optical waveguide.

FIGS. 1A to 3 are concerned with arrangements in which the optical rotation of the plane of polarization of the driving radiation beam is caused by use of a passively circularly birefringent optical waveguide or by an optical waveguide producing optical rotation by the Faraday effect. In contrast, FIGS. 4A and 4B concern an alternative approach in which rotation of the electric field of the driving radiation in an optical waveguide 404 is generated by the superposition of different excited modes of the optical waveguide, which are oppositely circularly polarized (i.e. contra-rotating), and which have different phase velocities in the optical waveguide.

The incident radiation beams $E_R$ and $E_L$ are coherent, oppositely circularly polarized radiation, being split from linearly polarized radiation 405 (having an electric field $E_0$ and a fundamental frequency $\omega_0$) emitted from a common source 402, and which propagate along the propagation axis 412 of the optical waveguide 404, to generate high harmonic radiation 414 (at high harmonic frequency $q\omega_0$). The incident right-handed and left-handed incident radiation beams $E_R$ and $E_L$ have equal intensities (again following the IEEE convention by which the direction of rotation is defined with respect to the source), but different lateral intensity distributions $I_R$ and $I_L$. The lateral intensity distributions $I_R$ and $I_L$ correspond with the modes of the optical waveguide that the incident radiation beams $E_R$ and $E_L$ excite. Within the optical waveguide 404 the excited modes superimpose to result in a summed electric field $E_{sum}$, which rotates about the propagation axis with a rotation period $2L_r=2\pi/(\beta_1-\beta_2)$, where $\beta_1$ and $\beta_2$ are the propagation constants of the respective modes of the optical waveguide. (It will be appreciated that the amplitude of the summed electric field $E_{sum}$ may beat along the propagation axis, but for the sake of clarity, this aspect has not been illustrated in FIG. 4A.)

The oppositely circularly polarized incident radiation beams $E_R$ and $E_L$, with different radial intensity distributions $I_R$ and $I_L$, may be generated by a laser 402 emitting linearly polarized radiation $E_0$ and an optical conditioning unit 460. The optical conditioning unit 460 comprises an optical splitter 462, quarter wave plates 464A and 464B, a spatial light modulator 466, mirrors 468 and an optical recombiner 470. The spatial light modulator 466 patterns the radial intensity distribution of one of the optical components from the optical splitter 462. The quarter wave plates 464A and 464B are respectively arranged at +45° and −45° to the linear polarization of the respective optical component, to generate opposite circular polarizations. The optical recombiner 470 forms a combined, collinear output of the optical components from the optical conditioning unit 460.

Figure 4A:
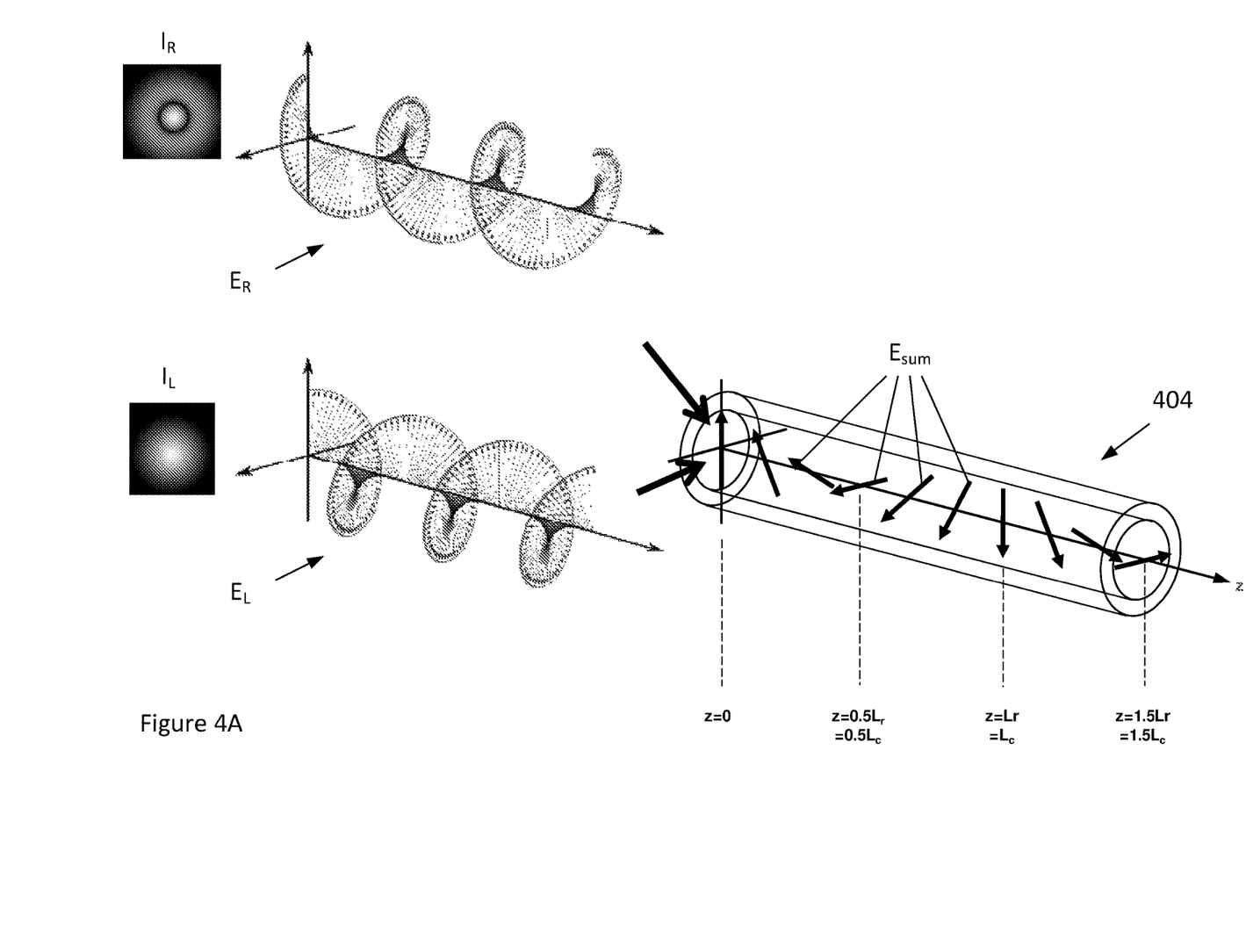
FIG. 4A shows electric fields of oppositely circularly polarised radiation incident into different optical modes of the optical waveguide and the corresponding summed driving radiation within the optical waveguide.
Figure 4B:
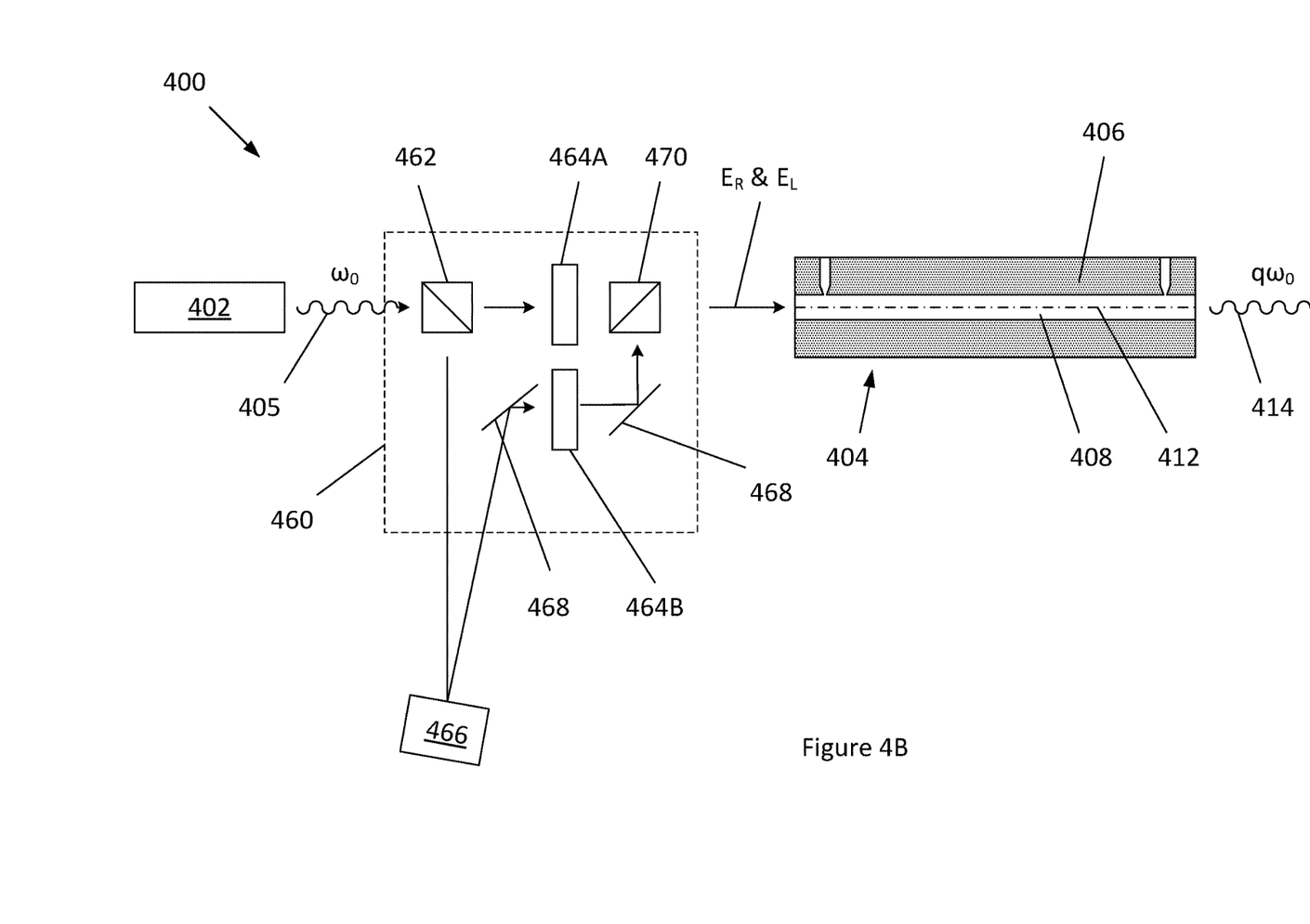
FIG. 4B shows an optical generator for high harmonic generation comprising a laser, a non-birefringent optical waveguide and an optical conditioning unit configured to provide oppositely circularly polarised radiation incident into the optical waveguide for exciting different modes of the optical waveguide.

In contrast to the birefringent waveguide 104 of FIG. 1A, the hollow core optical waveguide 404 of FIGS. 4A and 4B is not birefringent (e.g. a non-birefringent glass). The optical waveguide 404 comprises a cladding layer 406, and a hollow core 408 that has a circular cross-section. The hollow core 408 has a uniform cross-section along the propagation axis 412 of the optical waveguide 404. An arrangement is provided for the injection of a gaseous harmonic generation medium (e.g. noble gas, such as argon) into the hollow core 408 of the optical waveguide 404, and a vacuum is provided around the optical waveguide.

The optical waveguide 404 illustrated is a glass capillary that is 40 mm long (it may be between 10 and 100 mm in length, and preferably 30 to 60 mm), has a 3 mm external diameter, the cladding layer around the hollow core 108 has a refractive index of 1.1 or above (e.g. 1.47), and the hollow core has an average diameter of 5 to 100 μm. For example, in the case of incident light having a free space wavelength of 800 nm, this provides a coherence length of the fundamental waveguide mode and the preferred high order harmonic of the order of 0.1-1 mm.

Although the embodiment of FIGS. 4A and 4B concerns an optical waveguide that is non-birefringent, it would also be possible to use contra-rotating incident radiation beams to excite different radiation modes within a circularly birefringent waveguide that is passively circularly birefringent and/or circularly birefringent under application of an applied magnetic field by the Faraday effect or by application of an axial twist to the optical waveguide. Combination of these techniques may enable simplified manufacture and enhanced control of the optical generator.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A high harmonic optical generator comprising:
   a laser arrangement for emitting a beam of polarized radiation at a fundamental frequency, and
   an optical waveguide having a hollow core for a gaseous harmonic generation medium, the optical waveguide configured to generate high harmonics of the fundamental frequency in the presence of the gaseous harmonic generation medium in the hollow core, the optical waveguide having an optical propagation axis along the hollow core,
   the laser arrangement is configured to couple the beam of polarized radiation along the propagation axis of the hollow core optical waveguide to provide a beam of optical driving radiation for the high harmonic generation, the optical driving radiation having a plane of polarization that rotates about the propagation axis;
   wherein the optical waveguide is a circularly birefringent optical waveguide, and
   wherein the laser arrangement is configured for coupling a single beam of linearly polarized radiation into the optical waveguide.

2. The optical generator according to claim 1, wherein the optical waveguide is passively circularly birefringent.

3. The optical generator according to claim 1, wherein the optical waveguide comprises a circularly birefringent photonic crystal fibre.

4. The optical generator according to claim 1, comprising an axial twist control mechanism for tuning the rotational power of the circularly birefringent optical waveguide by axially twisting the optical waveguide.

5. The optical generator according to claim 1, wherein
   the optical waveguide is configured to produce optical rotation under a magnetic field, and
   the optical waveguide further comprises an electromagnetic coil configured to produce a magnetic field along the propagation axis of the optical waveguide.

6. The optical generator according to claim 1, wherein the optical generator is configured to provide optical driving radiation defining a length along the propagation axis corresponding to a period of rotation of a polarization vector about the propagation axis, and
   wherein an axial length of the optical waveguide is at least ten times the length corresponding to the period of rotation.

7. The optical generator according to claim 1, wherein the optical waveguide comprises an alternating arrangement of one or more each of left-handed and right-handed circularly birefringent optical waveguide sections.

8. The optical generator according to claim 7, wherein the optical generator is configured to provide optical driving radiation defining a length along the propagation axis corresponding to a period of rotation of a polarization vector about the propagation axis, and
   wherein an axial length of each optical waveguide section is at least ten times the length corresponding to the period of rotation.

9. The optical generator according to claim 7, wherein the sums of the lengths of the left-handed waveguide sections and the right-handed waveguide sections are substantially equal.

10. A high harmonic optical generator, comprising:
a laser arrangement for emitting a beam of polarized radiation at a fundamental frequency, and
an optical waveguide having a hollow core for a gaseous harmonic generation medium, the optical waveguide configured to generate high harmonics of the fundamental frequency in the presence of the gaseous harmonic generation medium in the hollow core, the optical waveguide having an optical propagation axis along the hollow core,
the laser arrangement is configured to couple the beam of polarized radiation along the propagation axis of the hollow core optical waveguide to provide a beam of optical driving radiation for the high harmonic generation, the optical driving radiation having a plane of polarization that rotates about the propagation axis;
wherein the laser arrangement comprises a laser and an optical conditioning unit,
wherein the optical conditioning unit is configured to receive a polarized beam from the laser arrangement and to emit a plurality of substantially collinear contra-rotating circularly polarized beams that are coupled along the propagation axis of the hollow core optical waveguide, and
wherein the optical conditioning unit is configured to couple the plurality of circularly polarized beams into different modes of the optical waveguide.

11. The optical generator according to claim 10, wherein the optical waveguide is non-birefringent.

12. The optical generator according to claim 1, wherein the optical driving radiation defines a length along the propagation axis corresponding to a period of rotation of a polarization vector about the propagation axis at the fundamental frequency, and an axial length of the optical waveguide along the propagation axis is substantially an integer multiple of half of the length corresponding to the period of rotation.

13. The optical generator according to claim 1, wherein the optical driving radiation defines a length along the propagation axis corresponding to a period of rotation of a polarization vector about the propagation axis at the fundamental frequency, and an axial length of the optical waveguide along the propagation axis is at least five times the length corresponding to the period of rotation.

14. The optical generator according to claim 1, wherein the optical waveguide has an inner cladding layer around the hollow core and an outer cladding layer around the inner cladding layer, and wherein the inner cladding layer has a higher refractive index for radiation from the laser arrangement than the outer cladding layer.

15. The optical generator according to claim 1, wherein the optical waveguide has a substantially uniform cross-section along the propagation axis.

16. The optical generator according to claim 1, wherein the laser arrangement comprises a laser configured to emit unpolarized light and an optical polarizing filter configured to filter light emitted from the laser.

17. The optical generator according to claim 1, wherein a gaseous harmonic generation medium is provided within the hollow core.

18. The optical generator of claim 1, wherein the optical waveguide includes a gas injection port to convey the gaseous harmonic generation medium to the hollow core.

19. The optical generator according to claim 10, wherein the optical waveguide is passively circularly birefringent.

20. The optical generator according to claim 10, wherein the cal waveguide comprises a circularly birefringent photonic crystal fibre.

21. The optical generator according to claim 10, comprising an axial twist control mechanism for tuning the rotational power of the circularly birefringent optical waveguide by axially twisting the optical waveguide.

22. The optical generator according to claim 10, wherein
the optical waveguide is configured to produce optical rotation under a magnetic field, and
the optical waveguide further comprises an electromagnetic coil configured to produce a magnetic field along the propagation axis of the optical waveguide.

23. The optical generator according to claim 10, wherein the optical generator is configured to provide optical driving radiation defining a length along the propagation axis corresponding to a period of rotation of a polarization vector about the propagation axis, the polarization vector comprising a summed electric field contribution from the different modes at the fundamental frequency, and
wherein an axial length of the optical waveguide along the propagation axis is substantially an integer multiple of half of the length corresponding to the period of rotation.

24. The optical generator according to claim 10, wherein the optical generator is configured to provide optical driving radiation defining a length along the propagation axis corresponding to a period of rotation of a polarization vector about the propagation axis, the polarization vector comprising a summed electric field contribution from the different modes at the fundamental frequency, and
wherein an axial length of the optical waveguide along the propagation axis is at least five times the length corresponding to the period of rotation.

25. The optical generator according to claim 10, wherein a gaseous harmonic generation medium is provided within the hollow core.

26. The optical generator of claim 10, wherein the optical waveguide includes a gas injection port to convey the gaseous harmonic generation medium to the hollow core.

* * * * *

UNITED STATES PATENT AND TRADEMARK OFFICE
CERTIFICATE OF CORRECTION

PATENT NO. : 9,645,470 B2
APPLICATION NO. : 14/401671
DATED : May 9, 2017
INVENTOR(S) : Liu et al.

It is certified that error appears in the above-identified patent and that said Letters Patent is hereby corrected as shown below:

In the Claims

In Column 12, Line 14, in Claim 20, delete "cal" and insert --optical-- therefor Signed and Sealed this
Thirty-first Day of July, 2018

Andrei Iancu
*Director of the United States Patent and Trademark Office*